United States Patent
Chow et al.

(12) 
(10) Patent No.: US 6,748,220 B1
(45) Date of Patent: Jun. 8, 2004

(54) RESOURCE ALLOCATION IN WIRELESS NETWORKS

(75) Inventors: Jocelyn Yuet Kiu Chow, Nepean (CA); Indranil B. Tapadar, Nepean (CA)

(73) Assignee: Nortel Networks Limited, St. Laurant (CA)

( * ) Notice: Subject to any disclaimer, the term of this patent is extended or adjusted under 35 U.S.C. 154(b) by 0 days.

(21) Appl. No.: 09/566,118

(22) Filed: May 5, 2000

(51) Int. Cl.[7] .................................................. H04Q 7/20
(52) U.S. Cl. ..................................... 455/450; 455/452.1
(58) Field of Search .................................. 455/450, 451, 455/452.1, 452.2, 453, 459, 504, 509; 370/329, 330, 331, 332, 333, 337–347, 348

(56) References Cited

U.S. PATENT DOCUMENTS

| | | | |
|---|---|---|---|
| 3,246,084 A | | 4/1966 | Kryter |
| 4,384,357 A | | 5/1983 | deBuda et al. |
| 4,470,145 A | | 9/1984 | Williams |
| 5,491,837 A | * | 2/1996 | Haartsen ........................ 455/62 |
| 5,600,680 A | | 2/1997 | Mishima et al. |
| 5,606,731 A | | 2/1997 | Pace et al. |
| 5,633,815 A | | 5/1997 | Young |
| 5,870,670 A | | 2/1999 | Ripley et al. |
| 5,956,642 A | * | 9/1999 | Larsson et al. .............. 455/449 |
| 6,314,279 B1 | | 11/2001 | Mohindra |
| 6,330,244 B1 | | 12/2001 | Swartz et al. |
| 6,442,151 B1 | * | 8/2002 | H'mimy et al. ............. 370/333 |

FOREIGN PATENT DOCUMENTS

| | | | | |
|---|---|---|---|---|
| DE | 196 27 640 A1 | 1/1997 | ............ | H03D/7/12 |
| EP | 0 087 336 A1 | 8/1983 | ............ | H03D/7/12 |
| EP | 0 087 336 B1 | 7/1986 | ............ | H03D/7/12 |
| EP | 0 254 844 A2 | 2/1988 | ............ | H03D/7/00 |
| EP | 0 632 577 A1 | 1/1995 | ............ | H03D/7/16 |
| EP | 0 789 449 A2 | 8/1997 | ............ | H03D/7/12 |
| FR | 2 669 787 A1 | 5/1992 | ............ | H03D/7/14 |
| GB | 2 324 919 A | 11/1998 | ............ | H03D/7/18 |
| JP | 60-130203 | 7/1985 | ............ | H03D/7/00 |

OTHER PUBLICATIONS

Translation of Japanese Patent Publication No. 60–130203, 3 pages.
Razavi, B., A 900–MHz/1.8–Ghz CMOS Transmitter for Dual–Band Applications, *Symposium on VLSI Circuits Digest of Technical Papers,* IEEE, pp. 128–131 (1998).
Ritter, G.M., "SDA, A New Solution for Transceivers," *16th European Microwave Conference,* Microwave Exhibitions and Publishers, pp. 729–733 (Sep. 8, 1986).
DIALOG File 351 (Derwent WPI) English Language Patent Abstract for FR 2 669 787, 1 page (May 29, 1992–Date of publication of application).
U.S. patent application Ser. No. 09/293,283, filed Apr. 16, 1999, Cook et al.

* cited by examiner

*Primary Examiner*—Jean Gelin

(57) ABSTRACT

An apparatus and method which improves data transfer between a plurality of MSs and a BS through an improved resource allocation scheme is disclosed. The resource allocation scheme disclosed, unlike previous schemes, takes into account the quality of the channel between each $MS_i$ and the BS for both uplink (UL) and the downlink (DL) temporary block flow (TBF). (The UL is the TBF wherein data is transferred from the MS to the BS and the DL is the reverse.) Using for example conventional linear programming methods, the traffic blocks (TB) in a timeslot (TS) available for allocation can be allocated to improve overall data throughput at the BS.

21 Claims, 5 Drawing Sheets

RESOURCE ALLOCATION IN WIRELESS NETWORKS

FIELD OF THE INVENTION

The present invention relates to wireless communications and more particularly to a method, system and apparatus for allocating resources in order to improve data throughput of basestations in a wireless network.

BACKGROUND TO THE INVENTION

As is well known, the use of wireless communications for voice communications is growing at a phenomenal rate. To accommodate this rate of growth, organizations providing wireless communications services have attempted to meet demand by an increased rate of deployment of new basestations (BS) and related infrastructure.

In addition to the growth in the use of wireless communications for voice transmissions, the wireless industry has seen an even faster rate of growth in use of its wireless communications infrastructure for data transmissions. Leading this increase in usage has been data enabled mobilestations (MS) such as the hand-held Palm™ available from Palm Computer Corp. and the i9000™ from Nokia OY. These data enabled mobilestations (which may also have voice capabilities) may transmit data over the wireless network using conventional data protocols such as the Internet and the Wireless Application Protocols (IP and WAP, respectively).

However, despite the tremendous efforts of these organizations to satisfy the demand for bandwidth by their customers, instances of insufficient of data resources in the wireless networks are, unfortunately, all too common. This insufficiency results in longer time periods for a data request to be satisfied resulting in dissatisfied and frustrated users.

In the Time Division Multiple Access (TDMA) wireless regime, the data resources are fixed slices of time, known as timeslots in a TDMA frame, which can be allocated to individual wireless users. The resources allocated to a single individual over a series of frames form a virtual channel between the user's wireless MS (such as a wireless phone) and the BS.

Unfortunately, for a given time period, the number of TDMA frames, and thus the number of timeslots, that are available for allocation to wireless users is finite and therefore limiting. While the data transfer rate during each timeslot could be increased, an increased data transfer rate is often insufficient to meet the demand for resources by wireless users.

Compounding the problem of a shortage of wireless resources, some wireless service providers have also attempted to provide some users with a guaranteed level or quality of service (QoS). In the providing a guaranteed QoS to some users, the number of resources available to other users without QoS guarantees is diminished for a given time period.

In the past, data resources over a given time period have been allocated amongst wireless users requesting such resources on a "best effort" basis. As persons skilled in the art are aware, some mobilestations have the feature or capacity to transmit and/or receive (i.e. handle) data in more than one timeslot in a given TDMA frame. Moreover, there are various grades or levels to these "high capacity" MSs. That is, at one level or grade, a high capacity MS may be able to handle one timeslot per frame in transmitting data to the BS and handle two timeslots per frame in receiving data from the BS. A next level or grade of high capacity MS may be, for example, able to handle two timeslots per frame in transmitting and receiving data. Additional levels or grades of high capacity MSs may also be defined.

The "best effort" allocation scheme currently employed typically allocates more data resources to those MSs which have the capacity to handle additional timeslots. As will be appreciated, some high capacity MSs may, over a given time period, be allocated less resources than they are capable of handling due to the finite availability of resources. Unfortunately, this "best effort" allocation scheme has proven to be unsatisfactory for a number of reasons. First, the best effort allocation scheme will allocate proportionally more of the available resources to those MSs which have the capacity to handle additional timeslots. However, as will be appreciated by those of ordinary skill in the art, a channel between a high capacity MS and the BS may be of very poor quality. Therefore, the errors received as a result of these poor quality channels will reduce the net data throughput (i.e., the data reliably received by the recipient). As a result, much of the resources or bandwidth allocated to those high capacity MSs which have poor channels with the BS is wasted. This waste of resources may result in other MSs, which could establish a high quality channel but have not been allocated their maximum capacity of resources, having their net data throughput unnecessarily and unduly restricted. As a result, the overall net data throughput of a BS is limited by the allocation of resources to those MS with poor quality channels. Further, since the capacity of each MS is predefined and does not change over time, the best effort scheme is static—not accounting for changes in properties of the channels between the BS and MSs over time.

Accordingly, a resource allocation scheme is desired which optimizes the overall data throughput of a basestation which allows additional wireless users to be serviced or existing wireless users to be serviced more efficiently without the deployment of additional basestations or an increase in data transfer rate between the mobilestations and the basestation. It is also desirable to employ a resource allocation scheme which is sufficiently flexible to adapt to circumstances where QoS guarantees have been made.

SUMMARY OF THE INVENTION

The present invention improves (i.e., increases aggregate) the quantity data transferred between a plurality of MSs and a BS and hence data that is reliably received by the designated recipient (i.e. the corresponding BS or MS) using an improved resource allocation scheme. This resource allocation scheme, unlike previous schemes, takes into account the quality of the channel between each MS and the BS for either or both of uplink (UL) and the downlink (DL) temporary block flows (TBFs). (The UL is the TBF wherein data is transferred from the MS to the BS and the DL is the reverse. TBFs for UL and DL are considered to be distinct transfers.) Conventional linear programming methods may be used to optimize the overall data throughput at the BS by allocating timeslots to a channel between the BS and a MS in accordance with the allocation scheme disclosed.

Advantageously, the resource allocation scheme uses the aggregate throughput which uses the actual reliably received data rates (rather than transmitted data rates) for some TBFs in a given time period to allocate the resources in a subsequent time period. In this manner those channels which are of higher quality and have a higher rates of data transfer are allocated a larger proportion of the resources available.

Allocating a larger proportion of resources (i.e., giving priority) to those channels which are of higher quality and have a higher data transfer rate increases the aggregate data transfer rate of the BS. In contrast, conventional basestations may have allocated a larger portion of resources to a channel which had a lower data transfer rate and/or was of lower quality.

Further, since different MSs communicate with a BS at different data rates, the allocation scheme attempts to satisfy resource requests by allocating more resources to those MSs which are of high quality and have a high data transfer with the goal that the resources allocated to these types of channels will result in those MSs terminating their sessions with the BS quickly thus freeing up resources at a later time to the channels that are of low quality and/or have a low data throughput rate. Moreover, in the interim, since the wireless channel is dynamic, the quality and throughput of the these latter channels may have improved. As a result, the overall data throughput of a BS using the allocation scheme of the invention over a long period of time may outperform the conventional BS resource allocation schemes.

The resource scheme of the present invention may be applied to only the UL TBFs; only the DL TBFs; to both the UL and DL TBFs.

In one aspect of the invention there is provided a method of allocating data resources for a plurality of channels, each of said plurality of channels enabling communication between a basestation (BS) and a mobilestation (MS), the method comprising: determining a maximum data transmission, absent any errors, of a basestation for the aggregation of the plurality of channels supported by the basestation based on: the number of the plurality of channels supported by the basestation; a bit rate associated with each of the plurality of channels; and a quantity of data resources to be allocated by the basestation; optimizing an objective function, the objective function equal to the maximum data throughput diminished by a factor corresponding to the quality of at least some of the plurality of channels, the optimizing subject to: all of the data resources being allocated; and each of the plurality of channels being allocated at least a portion of the resources; and allocating the data resources based on the optimizing.

In a further aspect of the invention there is provided a resource allocator in a basestation (BS), the BS forming part of a wireless network, the resource allocator operable to: obtain a number of mobilestations (MS) requiring resources, a quantity of resources available for allocation and a data transfer rate of the channel between each MS and the BS; obtain a quality metric for at least some of the channels between the BS and at least some of the mobilestations; allocate resources available for allocation at the BS based on an optimization of an objective function, the objective function reducing a calculated total data transmission quantity by a quality quantity corresponding to a quantity metric of a least some of the channels between the BS and each MS, the objective function subject to the constraints that the MS be allocated at least a portion of the resources available for allocation and all the resources available be allocated.

In a further aspect of the invention there is provider a method of optimizing allocation of resources for uplink channels between a plurality of mobilestations (MS) and a basestation (BS), each uplink channel corresponding to a channel between one of the plurality of mobilestations and the BS, the method comprising: determining a quality measurement for a portion of the uplink channels; determining an approximate total data able to be transmitted between the plurality of MS and the BS based on a data transfer rate for each channel, the number of the plurality of mobilestations and the quality measurement for a portion of the channels; optimizing an allocation of the wireless resources based on the approximate total data throughput and the constraints that all resources be allocated and that each of the plurality of MS be allocated a portion of the wireless resources available.

In a further aspect of the invention there is provided a a method of allocating timeslots within a current group of timeslots to a plurality of communications channels transported within sequential groups, each of said groups comprising a fixed number of timeslots, said method comprising: allocating a percentage of said fixed number of timeslots to each of said plurality of channels so as to maximize an estimated total number of bits received without error by a recipient within said current group by estimating a number of bits in error for each of said channels for said current group based on a measured number of bits in error for each of said channels in at least one previous group.

In a further aspect of the invention there is provided in a communications system in which a plurality of communications channels are transported in sequential pool of resources having a fixed number of timeslots, a method of allocating timeslots within a current pool of resources to said plurality of communications channels, said method comprising: allocating a percentage of said fixed number of timeslots to each of said plurality of channels so as to improve an estimated overall data throughput of the current pool of resources by: calculating the actual data throughput of a pool of resources of a previous pool of resources; defining an allocation function to be optimized, the allocation function being a function of the quality and data rate of each channel and the percentage such that high quality and high data rate communications channels are allocated a larger percentage of said fixed number of timeslots than communications channels of low quality and low data rates; and wherein each of said plurality communications channels is allocated at least some percentage of said fixed number of timeslots.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood with reference to the following detailed description read in conjunction with the drawings, in which.

DETAILED DESCRIPTION

Figure 1:
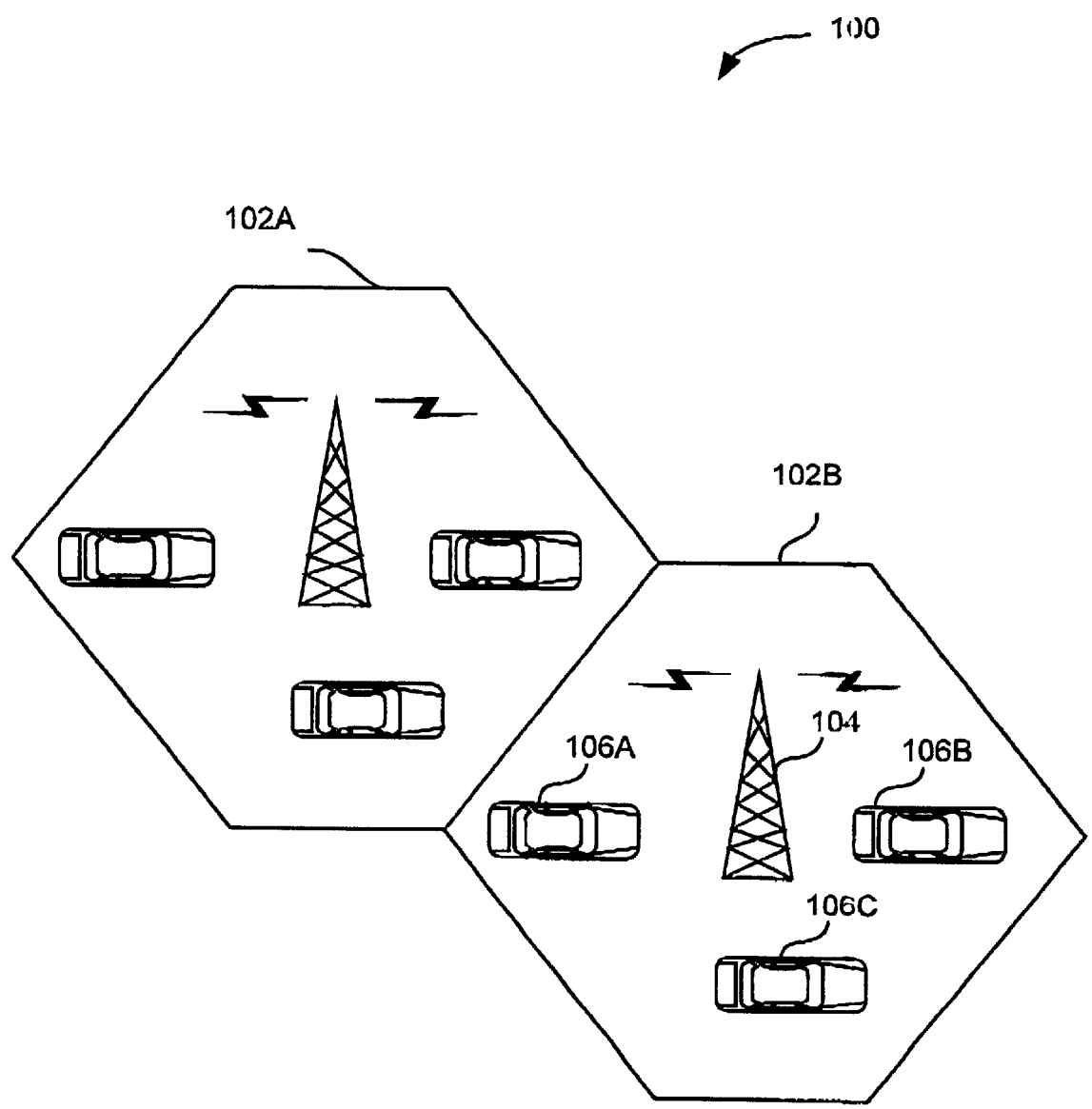
FIG. 1 is a schematic of a wireless network including a BS exemplary of an embodiment of the present invention.

FIG. 1 illustrates a wireless network 100 including wireless BS 104, exemplary of an embodiment of the present invention. Wireless network 100 includes a group of wireless network cells 102A, 102B (hereinafter collectively and individually cell or cells 102) each of which serves a separate geographical area. As will be appreciated by those of ordinary skill in the art, cells 102 need not provide similar geographic coverage, as illustrated, but may be sized differently depending upon the density of communication resources required for a particular area. Cell 102A includes the exemplary basestation 104 which is in wireless communication with a plurality (three as illustrated) mobilestations 106A, 106B and 106C (hereinafter MS 106). Cell 102B is similar to cell 102A. Basestations 104 of cells 102A and 102B allocate resources in manners exemplary of the present invention.

Wireless network 100 in the described embodiment is a TDMA network. That is, a virtual channel (i.e., a UL or DL TBF) between a MS 106, such as MS 106A, and BS 104A is formed by one or more timeslots in a series of TDMA frames, as for example detailed in *Principles and Applications of GSM* by Vijay Kumar Garg and Joseph E. Wilkes, Prentice-Hall, 1999, ISBN 0-13-949124-4, the contents of which are incorporated herein by reference. As will be appreciated by those of ordinary skill in the art, the allocation scheme described herein could also be applied to other wireless regimes such as, for example, GSM, GPRS, E-TDMA (described briefly below) and others.

In operation, a MS 106 requests wireless resources (i.e., one or more timeslots) from a BS 104 so that a channel between the MS 106 and a third party can be established. The third party may, for example, be another MS—in the same or a different cell; a wired station, such as a conventional telephone handset; a web or data server; a computer; or the like. Responsive to this request, BS 104 allocates sufficient wireless resources to allow MS 106 to commence two-way communications (using the UL and DL TBFs) with the third party. The BS 104 and MS 106 also negotiate a bit rate (i.e., the rate of data transfer between the BS 104 and MS 106) that will be initially used. The resources allocated to the MS 106 include both an UL TBF (from MS 106 to BS 104) and a DL TBF (from BS 104 to MS 106). Once resources have been allocated for a particular group or pool of resources (described below), communications, which may include voice and/or data, between the MS 106 and the third party can proceed.

During the communications session between MS 106 and the third party, the quality (e.g., the data received without errors) of the UL and/or DL TBFs may change. If the quality of a TBF does change, MS 106 and BS 104 may re-negotiate the bit rate (i.e., the modulation scheme) to accommodate this change and ensure reliable communications. Further, as the quality of the channel changes over time, a more or less robust error correction and detection scheme (i.e., coding scheme) may be desired and can be negotiated between the BS 104 and the MS 106. For example, if the quality of the channel degrades, BS 104 and MS 106 may negotiate a slower bit rate (i.e., the modulation scheme) and/or use an error correction and detection scheme (i.e., a coding scheme) that is more robust and includes improved error correction schemes. Similarly, if the quality of the channel improves, BS 104 and MS 106 may negotiate a faster bit rate (i.e., modulation scheme) and/or use an error detection and correction scheme (i.e., coding scheme) that includes less robust error correction schemes. Since each MS 106 negotiates and re-negotiates a bit rate with BS 104, and the resources allocated to a MS 106 is a timeslot (i.e., a specific duration of time to transfer data), the number of bits which may be transmitted over the timeslot is not fixed, but, rather, is dependent upon the bit rate negotiated at that point in time. Further, and as a result of a change in the error detection and correction scheme (i.e., coding scheme) negotiated, the number of information bits for a given bit rate over a selected period of time transmitted will depend on the error correction and detection scheme negotiated. That is, for a given bit rate and period of time, the number of bits that can be transmitted is fixed. This fixed number of bits will include information bits and error correction and detection bits. As the robustness of the error correction and detection scheme increases, the number of information bits decreases (for a given bit rate and time period), and vice versa.

Figure 2A:
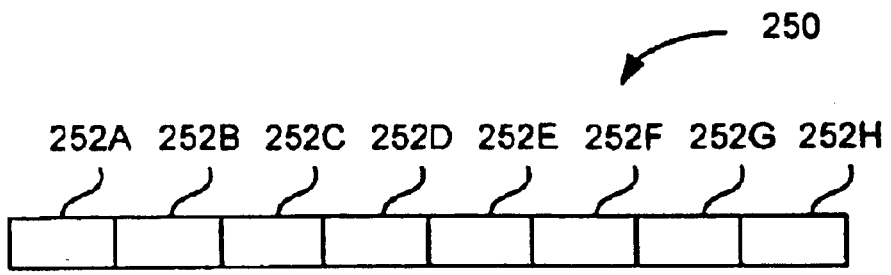
FIG. 2A is a schematic of an exemplary data frame used by the BS of FIG. 1.

FIG. 2A illustrates a conventional Time Division Multiple Access (TDMA) data frame 250 exemplary of the TDMA wireless standard transferred from or to BS 104 of FIG. 1. As illustrated, the exemplary TDMA data frame includes eight data timeslots 252A, 252B, . . . , 252H. Each timeslot can be allocated to a single MS thus providing the MS with a slice of the data frame 250 for transmitting to, or receiving data from, BS 104. As will be appreciated by those of ordinary skill in the art, varying numbers of timeslots per data frame 250 could be employed. Further, the Extended TDMA (E-TDMA) standard, which provides additional data slots by sub-dividing each timeslot into a plurality of frequency ranges with each frequency range in a selected timeslot 252 being allocated, if required, to different MSs. In the E-TDMA standard, several (such as eight, for example) frequency ranges could be employed resulting in sixty-four data slots (eight timeslots 252 for every frequency range) being provided in a single data frame 250.

Referring now to FIGS. 1 and 2A, once one or more timeslots 252 in a data frame 250 have been allocated to a MS 106, MS 106 can commence data transmission with a third party by way of basestation 104. For an UL TBF, a user will, for example, speak into MS 106 where the analog voice data will be digitized and cached to memory forming part of MS 106. As will be appreciated by those of ordinary skill in the art, the data transmitted from the cached memory of MS 106 need not represent voice data but could be data representing a digital request, multimedia data, or any other type of data or combination of different data types. During the timeslot(s) allocated to MS 106, MS 106 will transmit data from its cached memory to BS 104 in a first data frame 250. During this transmission to BS 104, MS 106 will continue to receive, digitize and cache more data from the user. During a subsequent TDMA frame 250, MS 106 will again transmit data from its cached memory to BS 104 during the MS's assigned timeslot(s). For a DL TBF, the same caching and transmission of cached data sequence will occur over a series of TDMA frames 250 as occurs with an UL TBF, However, with the DL TBF, the transmission is from the BS 104 to the MS 106.

Figure 2B:
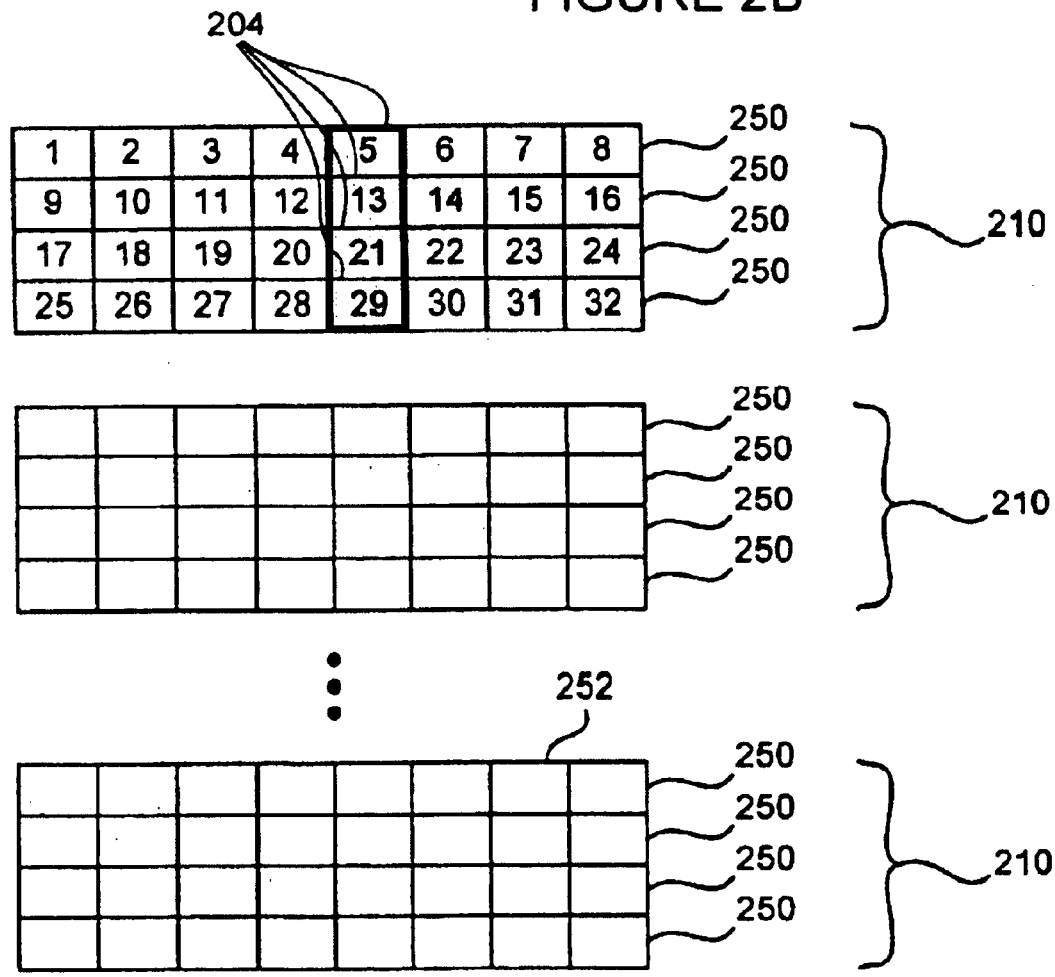
FIG. 2B is a schematic of a collection of the data frames of FIG. 2A.

FIG. 2B schematically illustrates a collection of frames 250 (FIG. 2A) which are used to allocate data resources, in a manner exemplary of the present invention. As illustrated, four frames 250, which may be sequential in time, are grouped together to form a frame group 210. During communication between a MS 106 and a BS 104 (FIG. 1), a timeslot 252 in each of the four frames 250 forming frame group 210 is assigned to communications between a selected MS 106 and a BS 104. For example, the four shaded timeslots 252 of FIG. 2A may be assigned to a selected MS 106 and form a single traffic resources block 204 (FIG. 2C)

which is described in greater detail below. A collection of frame groups 210 form a pool of resources 200 shown in FIG. 2C. The timeslots 252 in a single frame group 210 have been numbered, for ease of reference, in chronological order.

Figure 2C:
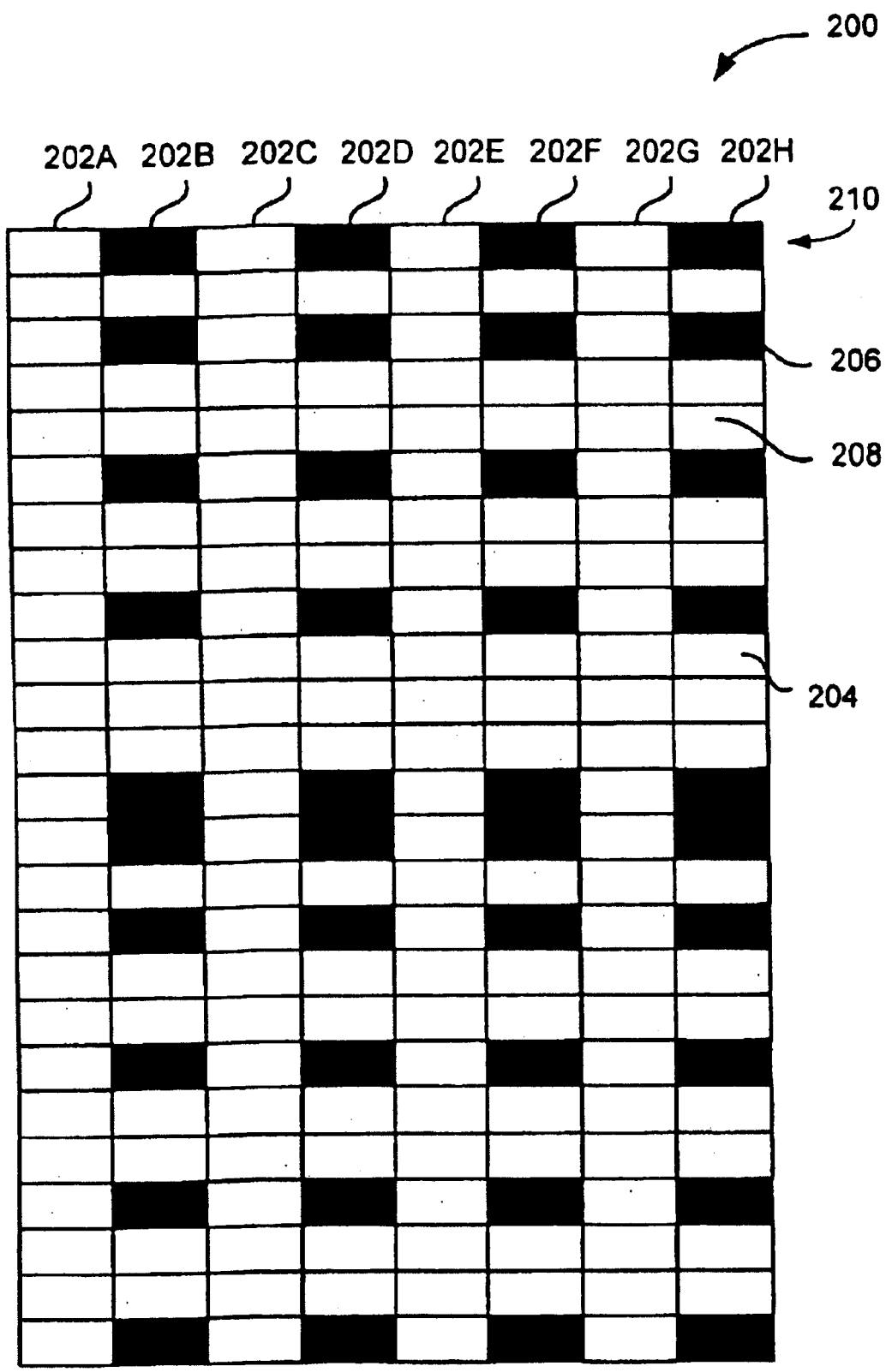
FIG. 2C is a schematic of an exemplary data resources map used by the BS of FIG. 1, the data resources map schematically representing the collection of data frames in FIG. 2B.

FIG. 2C illustrates a pool of resources 200 in the TDMA regime. Pool of resources 200 has plurality of data slots. For exemplary purposes only, pool of resources 200 has eight data slots 202A, 202C, . . . 202H (hereinafter individually and collectively data slot 202) with each data slot 202 defining a column in pool of resources 200. Each data slot 202 has a plurality of resource blocks 204 (twenty-four in the exemplary illustration). Resource blocks 204 allocated for communication between a selected MS 106 and a BS 104 over of sequence of pool of resources 200 provide a virtual channel to the user of the selected MS 106. Each resource block 204 represents the association of one or more timeslots 252 (such as four timeslots 252, for example—FIG. 2B) over a series of data frames 250 (FIGS. 2A, 2B) which have been allocated to a selected MS.

Accordingly, pool of resources 200 is simply the collection an arbitrary number of timeslots 252 (such as, for example, 778 timeslots 252—twenty four resource blocks 204 per data slot 202, eight data slots 202, and each traffic block 202 comprising four associated timeslots 252—FIG. 2A) to which the resource allocation scheme described herein is applied.

If desired, this resource allocation scheme could be applied to a single, conventional data frame 250, a series of data frames 250 or a pool of resources 200 of arbitrary size. Moreover, this allocation scheme is equally applicable in the E-TDMA regime.

As will be appreciated by those of ordinary skill in the art, this allocation scheme is applicable to any grouping of resources such as conventional TDMA data frames, a plurality of frames (which is the essence of a pool of resources 200), an E-TDMA frame, a grouping of E-TDMA frames, GSM frames, GPRS frames or the like.

As will become apparent, a large grouping of frames, namely the use of a pool of resources 200, has been selected to reduce computational intensity required to allocate data resources according to the scheme described herein. That is, by selecting a large group of timeslots which form pool of resources 200, the computational intensity required to perform the allocation scheme described below is reduced. As technology improves and the number of calculations that are able to be performed in a single time unit increases, it may be desirable to decrease the size of pool of resources 200.

Resource blocks 204 include control blocks 206 and traffic blocks 208. The control blocks 206 are reserved for signalling information for the set-up, maintenance and tear-down of TBFs and are reserved for control information. Control channels are formed from the control blocks 206 over a series or sequence of a pool of resources 200. In contrast, traffic blocks 208 are to be allocated for data communication and transfer between an MS 106 and a BS 104. Traffic blocks 208 form the remainder of resource blocks 204. Further, the number of control blocks 206 per pool of resources 200 is not fixed but may change from pool of resources to pool of resources. For example, the number of control blocks 206 in a first pool of resources 200 may be, for example, forty as illustrated in FIG. 2C. However, in a subsequent pool of resources 200, the number of control blocks 206 may be a lesser or greater number. As a result of the variability to the number of control blocks 206 over a series of pool of resources 200, the number of traffic blocks 208 also varies from pool to pool (e.g., if the number of control blocks 206 from one pool of resources 200 to the next pool of resources 200 increases, the number of traffic blocks 208 available for allocation would decrease from the first pool of resources 200 to the next pool of resources 200, and vice versa).

As will be appreciated by those of ordinary skill in the art, traffic blocks 208 are allocated based on resource requests received by a BS 104 from a plurality of MSs. In the present embodiment, the resource requests received by a BS 104 during a time period of a first pool of resources will be used to allocate the traffic blocks 208 in the subsequent pool of resources.

Resource requests may be received from an MS 106 which is already communicating with the BS 104 or from an MS 106 desiring to commence data transfer. The former is considered to be an active TBF and the latter is referred to as a new TBF. As will be appreciated, to ensure that calls or channels are not dropped, active TBFs are given priority over new TBFs. The exemplary method of resource allocation may apply to both active and new TBFs. A request received by a BS 104 from an MS 106 for a new TBF will be admitted, if resources are available, as an active TBF prior to the BS 104 allocating the resources for a particular pool of resources 200.

Figure 4:
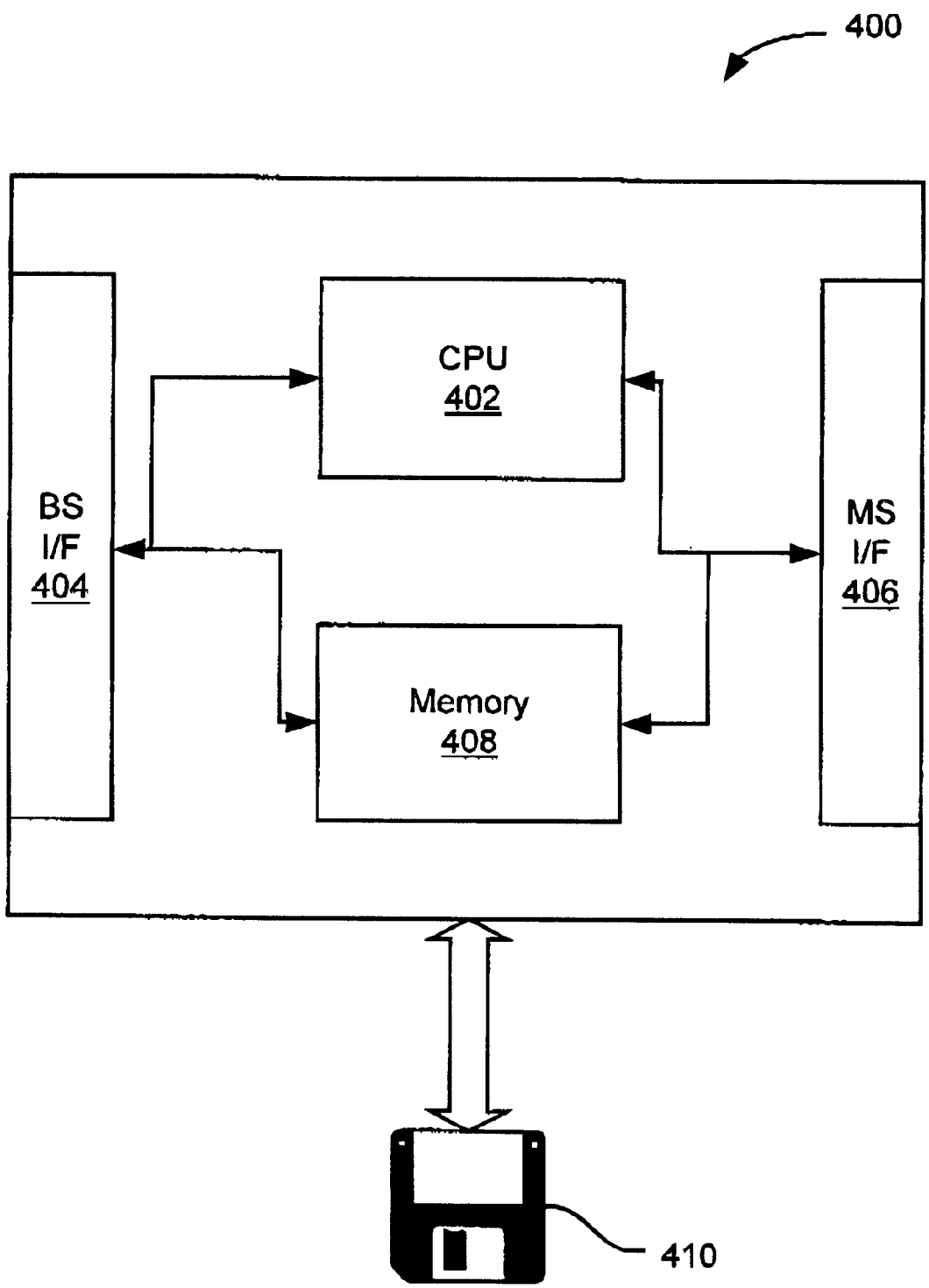
FIG. 4 is a schematic of an apparatus forming part of the BS of FIG. 1, and exemplary of an embodiment of the present invention.

FIG. 4 schematically illustrates a resource allocator 400 which implements the described resource allocation scheme exemplary of an embodiment of the present invention. Resource allocator 400, which may form part of a BS 104, includes a central processing unit (CPU) 402 in communication with memory 408, BS 104 interface (BS I/F) 404 and MS interface (I/F) 406. In the exemplary embodiment a resource allocator 400 is co-located with, and forms part of, each BS 104 in cells 102A and 102B of wireless network 100 (FIG. 1). It should be noted that resource allocator 400 may be a separate unit that forms part of wireless network 100 (FIG. 1) or, alternatively, it may form part of a node (e.g., a SGSN node) of wireless network 100. Moreover, resource allocator 400 may service one or many BSs 104.

As a BS 104 operates and controls the UL and DL TBFs independently and simultaneously, resource allocator 400 may implement the resource allocation scheme exemplary of the present invention for: only the UL TBF; only the DL TBF; or for both the UL and DL TBFs. Further, in the preferred embodiment, resource allocator 400 allocates resources to the UL and DL TBFs independently of each other.

Memory 408, as will be appreciated by those of ordinary skill in the art, may include a combination of volatile and non-volatile memory such as, for example, RAM, ROM and the like. Memory 408 may be the memory of BS 104.

CPU 402 may be a conventional processor such as RISC chip, Intel™ Pentium™—class processor or the like, that is sufficient to perform resource allocation operations 300 (FIG. 3) in the time frame desired, such as, for example, the duration of a single pool of resources 200 (FIG. 2C). CPU 402 may be the processing unit of BS 104.

Resource allocator 400 is also adapted to receive computer software or instructions from computer readable media 410. Computer readable media 410 may contain, for example, software, computer applications (including, for example, sub-routines corresponding to resource allocation operations 300—FIG. 3), computer data and the like. While computer readable media 410 is illustrated as a computer diskette, it could equally be a tape, memory chip, or other removable or non-removable computer readable medium. Furthermore, the computer readable media 410 may be a remote media, such as the memory of a remote computer, and be downloaded over a suitable channel such as over a network, internet, intranet, dedicated data link, or the like.

BS I/F 404 is adapted to transmit requests to, and receive responses from, a BS 104. BS I/F 404 may be a hardware interface which enables direct or indirect communication with a BS 104 or may be embodied in software adapted to transmit and receive messages to/from a BS 104. Alternatively, BS I/F 404 may be embodied in a combination of hardware and software. BS I/F 404 is tasked with transmitting a request to a BS 104 for a quality metric (described below) used in resource allocation operations 300 (FIG. 3) which is used to allocate resources for an UL TBF. Similarly, BS I/F would receive the response to such a request from the BS 104.

Figure 3:
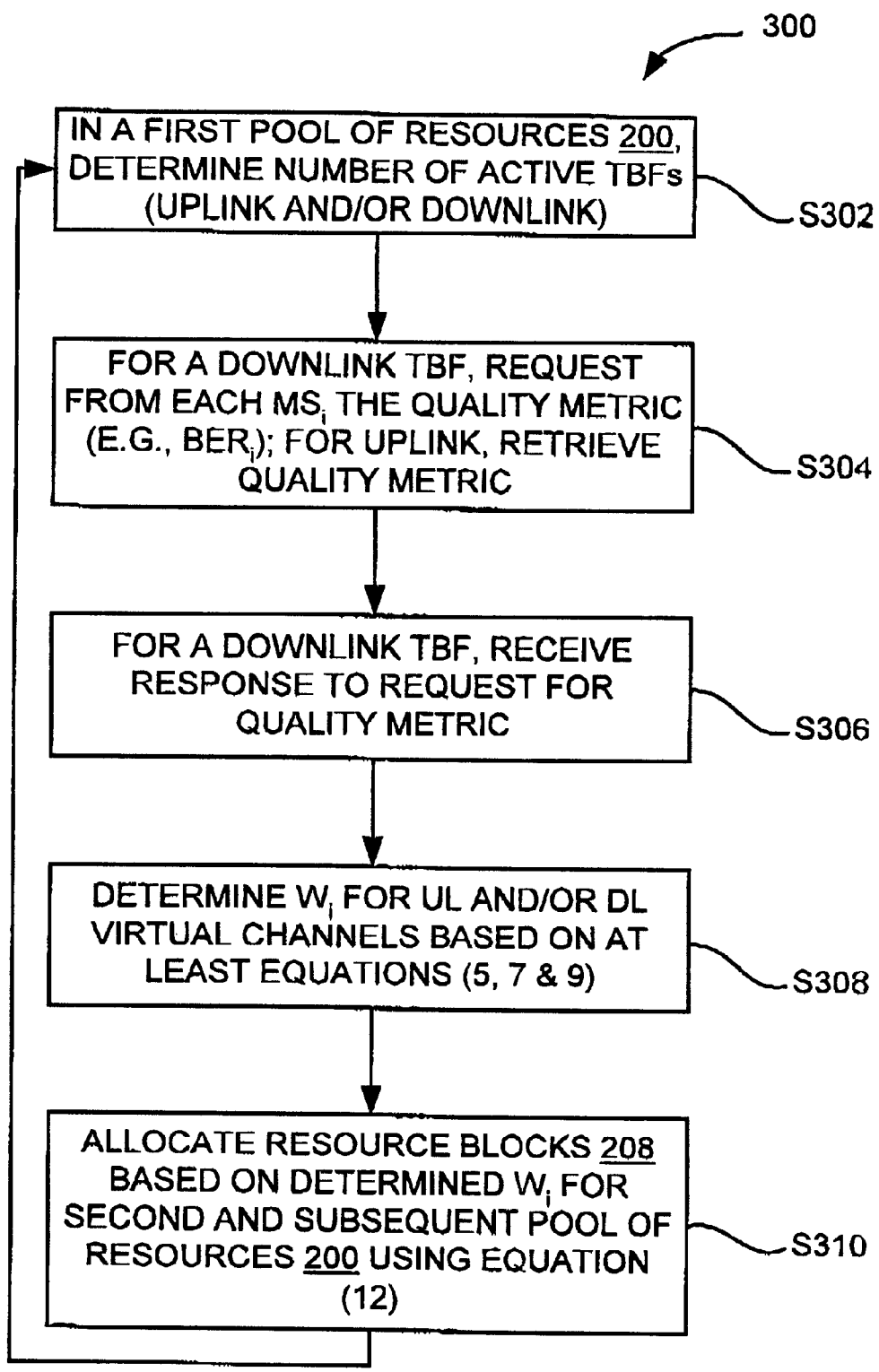
FIG. 3 is a flow chart illustrating the operation of the BS of the wireless network of FIG. 1.

Similar to BS I/F 404, MS I/F 406, which may also be embodied in hardware or software (or a combination thereof), is tasked with transmitting a request to each MS for a quality metric for the DL TBF in resource allocation operations 300 (FIG. 3). The request for a quality metric transmitted to each MS is for a measurement or assessment of the quality of the DL TBF channel between the BS and a selected MS. The quality metric, which may be, for example, a bit error rate or the like, is used by resource allocator 400 to determine or assess the actual (as compared to maximum or ideal) data throughput of the BS during a pool of resources 200 (FIG. 2). In response to a received request for a quality metric, a MS 106 will transmit a response to resource allocator 400 which will be received by the MS I/F 406 of resource allocator 400.

Turning now to the allocation scheme implemented by resource allocator 400, the traffic throughput per traffic block period ($S_{block}$) at the BS 104 for the $i^{th}$ MS (hereinafter $MS_i$) is defined by:

$$S_{block} = rb_i \times \text{Block Duration} \tag{Eq. 1}$$

where $rb_i$ is the raw data bit rate (e.g., bits per unit time including information and error correction data bits) associated with the modulation and coding schemes used by $MS_i$. Block Duration is the duration of the traffic block 208 which is the duration commencing from the beginning of the first timeslot 252 to the end of the last timeslot 252 (FIG. 2A) which form part of the traffic block 208. In FIG. 2A, the timeslots 252 in a frame group 210 have been numbered in the order the timeslots 252 are arranged in time (from one to thirty-two). In the exemplary embodiment, a Block duration is typically calculated, for example, from the beginning of the fifth timeslot 252 to the end of the twenty-ninth timeslot 252.

However, as noted above, the raw data bit rate ($rb_i$) includes both information and error correction data bits. The demarcation between information bits and error correction bits within a timeslot may or may not be clearly defined. Depending upon the error correction and detection scheme (i.e., coding scheme) employed at a given point in time for a selected TBF, the ratio of information to error correction data bits over a given time period will change. For more robust coding schemes, the proportion of the raw data bit rate that is dedicated to error correction and detection bits is typically larger than for less robust coding schemes. Conversely, for more robust coding schemes, the proportion of the raw data bit rate that is dedicated to information bits is typically less than the proportion of the raw data bit rate dedicated to information bits in less robust coding schemes. Accordingly, in an alternative embodiment of the present allocation scheme, the traffic throughput per traffic block period which accounts for the coding scheme ($S_{block}'$) at the BS 104 for the $i^{th}$ MS (hereinafter $MS_i$) is defined by:

$$S_{block}' = k_i/n_i \times rb_i \times \text{Block Duration} \tag{Eq. 1'}$$

Where $k_i$ is the number of information bits for the coding scheme in effect and $n_i$ is the total number of bits (i.e., information bits plus error correction and detection bits) for the coding scheme in effect where $K_i \leq n_i$. As will be apparent for those of ordinary skill in the art, $S_{block}'$, the traffic throughput per block period accounting for the coding scheme, will be less than $S_{block}$ defined by equation (1'). Applying equation (1') to the equations defined below will result in those TBFs which are of a higher channel quality, higher bit rate and are using a less robust coding schemes (i.e., a larger $k_i/n_i$) to be allocated proportionally more resources than those TBFs of similar a quality and bit rate but employing more robust coding schemes.

For a conventional traffic block 208, the Block Duration may be, for example, approximately 20 ms (0.02 s).

As described above, each pool of resources 200 (FIG. 2C) includes control blocks 206, which are reserved for control channels, and traffic blocks 208 which can be allocated to either an UL or DL TBF. Accordingly, for a given number of MSs (NMS) associated with a single BS for which resource allocation is to be performed, each $MS_i$ can be assigned a fraction of traffic blocks 208 within a pool of resources 200. Let the variable $W_i$ be the fraction, percentage or weight of available traffic blocks 208 that are available to be assigned to an $MS_i$. The total traffic throughput at a BS 104 for the resources which can be allocated (i.e., the traffic throughput for the traffic blocks 208 only) can be defined by:

$$S_{\text{pool of resources}} = \text{Block Duration} \times \sum_{i=1}^{NMS} rb_i \times W_i \times NBA \tag{Eq. 4}$$

or $$S_{\text{pool of resources}} = \text{Block Duration} \times NBA \sum_{i=1}^{NMS} rb_i \times W_i \tag{Eq. 4.1}$$

where:

$$\sum_{i=1}^{NMS} W_i = 1 \tag{Eq. 5}$$

and NBA defines the number of traffic blocks 208 that are available for allocation within a pool of resources 200. As noted above, the number of traffic blocks 208 is variable between data resource groups 200. That is, the number of control blocks 206 is not fixed, but may change between data resource groups 200. Accordingly, the number of traffic blocks 208 that are available for allocation will change depending upon the number of control blocks 206 for the particular data resource group 200.

The aggregate traffic (i.e., data) throughput for a selected $MS_i$ for a pool of resources is defined by:

$$S_{MSi} = \text{Block Duration} \times rb_i \times W_i \times NBA \tag{Eq. 6}$$

As will be appreciated, the traffic throughput for a selected $MS_i$ calculated by equation (6), and the data throughput for a BS calculated by equation (4.1) may change over time and from pool of resources to pool of resources since the bit rate for each $MS_i$ can change over time, and the portion of resources allocated to each $MS_i$ (i.e., $W_i$) may also change over time as the quality of the channel between a selected $MS_i$ and the BS changes. Further, and as discussed above, the bit rate ($rb_i$) mby also change over time. Accordingly, both equations (4.1) and (6) are dynamic—that is, they both reflect the possibility that the throughput during a pool of resources will change over time.

Similarly, and accounting for the dynamic nature of the coding scheme that could be employed, equations (4.1) and (6) could be redefined by using equation (1') as:

$$S'_{pool\ of\ resources} = Block\ Duration \times NBA \sum_{i=1}^{NMS} \frac{k_i}{n_i} \times rb_i \times W_i \quad (Eq.\ 4.1')$$

and $$S_{MSi}' = Block\ Duration \times k_i/n_i \times rb_i \times W_i \times NBA \quad (Eq.\ 6')$$

Based on the foregoing, optimizing the allocation of traffic blocks 208 should optimize the overall throughput for the BS 104 for every $MS_i$. However, optimizing equation (4.1) alone, does not fully address the quality of the channels between the BS 104 and each $MS_i$. As will be appreciated by a person of ordinary skill in the art, the overall number of bits received without error rarely, if ever, reaches the ideal amount of data that can be transmitted data over the period of time for a given pool of resources as defined by equation (4.1) due to errors introduced by the channel. The reduced number of bits received without error is the result of the overall quality of the channel, which may result from, amongst others, bit errors detected in both the physical layer transmission (i.e., L1 errors) or the need for the re-transmission of packets that have green dropped or damaged (i.e., L2 errors) at an earlier point in time. Accordingly, to improve or optimize resource allocation to maximize overall data throughput (absent errors) and minimize the average number of bit errors received, the resource allocator 400 allocates traffic blocks 208 which accounts for noise or other disturbances which degrade the quality of a channel. Accordingly, an objective function (J) can be defined as:

$$J = S_{pool\ of\ resources} - OQM \quad (Eq.\ 7)$$

where $S_{pool\ of\ resources}$ is the data throughput for the BS and is the sum data throughputs for each $MS_i$ as defined in equation (6) in communication with the BS. That is, $$S_{pool\ of\ resources} = \sum_{i=1}^{NMS} S_{MSi} \quad (Eq.\ 7.1)$$

OQM is the Overall Quality Metric which accounts for the quality of at least some of the channels between the BS 104 and each $MS_i$. That is, OQM may be a channel quality metric which is based on a sample number of the channels between the BS and a plurality of MSs. In this scenario, the OQM of a sample number of channels could be used to generate an approximate OQM for all channels. Alternatively, OQM could be the sum of the quality metric for all channels.

As above, equations (7) and (7.1) could be redefined in an alternate embodiment which would account for the coding schemes employed by each TBF by applying equations (1), (4.1) and (6) as:

$$J' = S_{pool\ of\ resources}' - OQM \quad (Eq.\ 7')$$

where $S_{pool\ of\ resources}'$ is:

$$S'_{pool\ of\ resources} = \sum_{i=1}^{NMS} S'_{MSi} \quad (Eq.\ 7.1')$$

In an alternative embodiment to either equations (7) or (7'), the objective function (J) may be defined by:

$$J = OQM \times S_{pool\ of\ resources} \quad (Eq.\ 7—Alternate)$$

or $$J' = OQM \times S_{pool\ of\ resources}' \quad (Eq.\ 7'—Alternate)$$

where OQM is a factor that accounts for the quality of at least some of the channels between BS 104 and each $MS_i$ and $$1 \geq OQM \geq 0 \quad (Eq.\ 7\ 1\ and\ 7.1'—Alternate)$$

As will be apparent from either equations (7), (7'), (7.1—Alternate) or (7.1'—Alternate), the objective function is equal to the overall maximum or ideal throughput of the basestation for a single pool of resources which is diminished in some manner (e.g., through subtraction, multiplication) due to the negative effects of the channel quality as reflected by an overall quality metric. This overall quality metric may account for the quality of every channel (in a desired direction—i.e., UL or DL) between the BS and each MS, or, alternatively, may account for the quality of only some of the channels.

Since the objective function (J), defined by equation (7), is a function of the data throughput of the BS, defined by equation (4.1) and the OQM, both of which are dynamic (i.e., they change over time and from pool of resources to pool of resources), objective function (J)—equation (7)—is also dynamic. Similarly, the alternate and prime versions of equation (7) are also dynamic.

As noted, overall data throughput at the BS for the current pool of resources 200 can be reasonably approximated by the historical overall data throughput at the BS for a previous pool of resources 200. The accuracy of the approximation is dependent upon the addition of new TBFs, the termination of existing TBFs and the variation in the quality of the virtual channels. Or to put it another way, the overall data throughput at the BS for a subsequent pool of resources 200 can be approximated by the overall data throughput at the BS in the current pool of resources 200.

As will be appreciated by those of ordinary skill in the art, there are many quality metrics which could be used. For example, the OQM may be a function of a sum of the bit error rates for each channel; a function of a sum of the retransmissions for each channel; a function of an average of the carrier to interference ratio for all channels; a function of an average of the receive signal strength indicator (RSSI) for all channels; a function of an average of the signal to noise ratio for all channels; a function of a sum of the symbol error rates for each channel; or any other similar quality measurement or a combination of any quality measurements. If the bit error rate, the symbol error rate or the number the re-transmissions are used, the objective function would be used to minimize these quality metrics. Conversely, using the carrier to interference ratio, the RSSI or the signal to noise ratio, the objective function would be used to maximize the negative effects of these quality metrics.

In the exemplary embodiment, the OQM may be defined by a function of the overall bit error rate for each virtual channel. For a given TBF virtual channel for a selected $MS_i$ for which resource allocation is to be performed, the raw bit error rate is defined by $BER_i$. Under current practices, resource allocation is typically performed in the data link layer (L2) independent, or without reference to, the physical layer (L1) In contrast, the invention described herein, performs resource allocation accounting for the quality of the physical layer (L1). Accordingly, the resource allocator 400 (FIG. 4) will request the bit error rate for each TBF for at least one of the UL and DL directions. For UL TBFs, the BER will be tracked and recorded by the BS 104 and thus will be easily accessible by the resource allocator 400 which may form part of or be co-located with the BS 104. However, each $MS_i$ may track and record the $BER_i$ for the DL TBF. Accordingly, the resource allocator 400 during a first pool of resources will transmit to each $MS_i$, a request for the DL $BER_i$ to be transmitted to the BS 104. The responses received by the BS 104 from each $MS_i$ may then be used to allocate traffic blocks 208 in the next pool of resources for the DL TBF.

For a pool of resources 200 for a given direction (i.e., UL or DL), the total number of bit errors (NBE) for the duration of a pool of resources 200 for all virtual TBF channels is defined as:

$$OQM = NBE = \text{Block Duration} \times NBA \times \sum_{i=1}^{NMS} rb_i \times W_i \times BER_i \quad \text{(Eq. 8)}$$

or $$NBE' = \text{Block Duration} \times NBA \times \sum_{i=1}^{NMS} \frac{k_i}{n_i} \times rb_i \times W_i \times BER'_i \quad \text{(Eq. 8')}$$

where NBE' is the total number bit errors when the coding scheme is taken into account and $BER_i'$ is the bit error rate in the information bits.

Given equation (8), and the desire that the data throughput of the BS 104 be maximized or improved while minimizing or reducing the overall bit errors during each pool of resources, the objective function (J) of equation (7) or (7') can then be defined as:

$$J = S_{pool\ of\ resources} - NBE \quad \text{(Eq. 9)}$$

or $$J' = S_{pool\ of\ resources}' - NBE' \quad \text{(Eq. 9')}$$

where $S_{pool\ of\ resources}$, $S_{pool\ of\ resources}'$, NBE and NBE' have been previously defined by equations (4.2), (4.2'), (8) and (8'), respectively. Consequently, substituting equations (4.2) and (8) into equation (9) gives the objective function as:

$$J = \text{Block Duration} \times NBA \times \left[ \sum_{i=1}^{NMS} rb_i \times W_i \times (1 - BER_i) \right] \quad \text{(Eq. 10)}$$

subject to:

$$\sum_{i=1}^{NMS} W_i = 1 \quad \text{(Eq. 5)}$$

and $$W_i > 0,\ i=1, \ldots, NMS \quad \text{(Eq. 11)}$$

The constraint described by equation (11) ensures that each TBF will be assigned at least one available traffic block 208 in a pool of resources 200.

Similarly, substituting equations (4.2') and (8') into equation (9') gives the objective function as:

$$J' = \text{Block Duration} \times NBA \times \left[ \sum_{i=1}^{NMS} \frac{k_i}{n_i} \times rb_i \times W_i \times (1 - BER'_i) \right] \quad \text{(Eq. 10')}$$

Allocating the resources, traffic blocks 208, can be performed by optimizing the objective function of equation (10) or (10') and solving for the optimal solutions for the weights or percentages $W_i$ given the constraints of equations (5) and (11). An optimal solution for weights $W_i$ can be determined by applying conventional linear programming techniques known to those of ordinary skill in the art and described in *Numerical Recipes in C—The Art of Scientific Computing*, $2^{nd}$ Edition, William H. Press et al., Cambridge University Press, 1994, ISBN 0-5214-3108-5) and *Linear Programming* by Vasek Chvatal, W. H. Freeman and Company, 1980 (ISBN 0-7167-1195-8), the contents of both of which are hereby incorporated herein by reference. Methods for optimizing equations (10) or (10') given the constraints of equations (5) and (11), other than linear programming techniques, could also be used if desired.

Once an optimal solution to equations (10) or (10') has been derived through conventional linear programming or other techniques, the traffic blocks allocated to a selected $MS_i$ in the pool of resources subsequent to the pool of resources during which the calculations and operations are performed is defined by:

$$TB_i = \max(1, W_i \times NBA) \quad \text{(Eq. 12)}$$

To ensure that an attempt is not made to allocate more traffic blocks than are available, it may be preferable to first allocate to each channel a single block. Accordingly, the number of blocks remaining would be NBA—NMS (i.e., the number of blocks available for allocation would be reduced by the number of mobilestations—NMS—requiring data resources). Thereafter, these remaining blocks could then be allocated according to equation (12.1)—a modification of equation (12)—as follows:

$$TB_i = \max(1, W_i \times (NBA - NMS)) \quad \text{(Eq. 12.1)}$$

As will be appreciated, equations (1) through (11) do not address the circumstances where an $MS_i$ has been guaranteed a specific QoS for either the UL or DL (or both) TBFs. For a selected $TBF_i$, a QoS range may be guaranteed. A QoS range could be defined by a maximum and minimum number of required traffic blocks 208 per pool of resources 200 for a selected $MS_i$ ($MaxQoSBlks_i$ and $MinQoSBlks_i$, respectively) required to satisfy the guaranteed QoS. However, as noted previously, only a specified number of traffic blocks 208 are available in a selected pool of resources 200 for allocation (NBA). Accordingly, equations (5), (9), (10) and (11) may be solved while accounting for QoS guarantees by introducing a constraint on $W_i$ within the objective function (J) of equation (9) as follows:

$$p\max_i = MaxQoSBlks_i / NBA \quad \text{(Eq. 13)}$$

$$p\min_i = MinQoSBlks_i / NBA \quad \text{(Eq. 14)}$$

wherein $$\sum_{i=1}^{NMS} p\max_i \le 1 \quad \text{(Eq. 15)}$$

$$1 \ge p\max_i \ge 0, \forall i \quad \text{(Eq. 16)}$$

$$\sum_{i=1}^{NMS} p\min_i \le 1 \quad \text{(Eq. 17)}$$

$$1 \ge p\min_i \ge 0, \forall i \quad \text{(Eq. 18)}$$

such that:

$$p\max_i \ge W_i \ge p\min_i, \forall i \quad \text{(Eq. 19)}$$

Applying conventional linear programming techniques to equations (9) and (10) subject to the constraints of equations (5), (11) and equations (13) through (19)—which account for QoS guarantees—traffic blocks 208 (FIG. 2C) can then be allocated to each $MS_i$ through solving for $W_i$. The alternative prime functions (described above and noted with a') could also be employed to the quality of service equations (13) through (19) if desired.

In a still further alternative, the objective function (J) could be defined to account for data which has been retransmitted during the time period encompassed by a pool of resources 200. That is, it may be desirable to account for those instances where a BS 104 or a MS 106 has had to retransmit data during earlier timeslots due to the corruption of the original data transmission. The amount of data retransmitted during a selected pool of resources is a metric conventionally tracked by a BS 104 and/or a MS 106. Accordingly, a further alternative objective function (J") could be defined as:

$$J'' = \text{Block Duration} \times NBA \times \left[ \sum_{i=1}^{NMS} \frac{k_i}{n_i} \times rb_i \times W_i - NBR_i \right] \quad \text{(Eq. 10'')}$$

where $NBR_i$ is the number of information bits for the $i^{th}$ TBF which were retransmitted during the time period covered by the pool of resources 200. Equation (10") could have the coding scheme factor (i.e., $k_i/n_i$) removed if desired.

In FIG. 3, resource allocation operations 300 are exemplary of one method of performing the resource allocation scheme described herein. In S302, the resource allocator 400 determines, in a conventional manner, the number of active TBFs (UL or DL) for the subsequent pool of resources 200 that require resources (i.e., the NMS) and the quantity of traffic blocks 208 (FIG. 2C) that are available for allocation in the pool of resources 200 (i.e., NBA). During operation S302, resource allocator 400 will also request and receive the data or bit rate ($rb_i$) for each of the channels being supported by the BS 104. The bit rate ($rb_i$) is required for calculating the overall data transfer for each $MS_i$ (i.e. $S_{MSi}$ as defined by equation (6)). The bit rate ($rb_i$) is also required for calculating the number of bit errors (NBE as defined by equation (8)).

As noted above, the UL and DL TBFs are independent of each other. Accordingly, the UL and DL TBFs have separate pools of resources 200. The allocation scheme described herein can be applied to each of these separate pools of resources. That is, a single pool of resources 200 will not have some traffic blocks 208 allocated to UL TBFs and other traffic blocks 208, within the same pool of resources 200, assigned to DL TBFs. The determinations of S302 may be performed by transmitting a request to BS 104 (via BS I/F 404) followed by receiving (via BS I/F 404) a response from BS 104 responsive to the request.

Resource allocator 400 also determines the OQM based on the channel quality metrics received for each TBF (i.e., for each $MS_i$) in S304. For uplink TBFs, if a conventional quality metric is used (such as those described above), the BS 104 will typically track and store the quality metric (e.g., BER) for each $MS_i$. Accordingly, to obtain the desired quality metric, the resource allocator 400 may transmit a request through BS I/F 404 for this information to BS 104 and, responsive to this request, receive the desired information for each $MS_i$. In the case of DL TBFs, the quality metric information may, however, be stored by the individual MSs. Accordingly, the resource allocator 400 will transmit a request (via the BS 104) to each $MS_i$ to transmit the desired quality metric back to the resource allocator 400. The resource allocator 400 may then receive, from each $MS_i$, the desired quality metric information (S306).

Once the quality metric has been received (for either UL or DL TBFs), in the case of the BER, the quality metric information may then be summed, in accordance with equation (8) to determine the OQM. Once the OQM has been determined (S304, S306), the weights $W_i$, for each $MS_i$ must be determined (S308) in accordance with at least equations (5), (7) and (9). (Where the resource allocator 400 is deployed in an environment with QoS constraints, then equations (13) through (19) should also be applied.) As is apparent, equations (7) and (9) are dependent upon the bit rate ($rb_i$) of each channel. The bit rate for each $MS_i$ is typically stored by the BS. Accordingly, in determining the weights ($W_i$), resource allocator 400 will request and receive this information from the BS 104 through the facilities of BS I/F 404. Thereafter, the resource allocator 400 can determine and allocate, in accordance with equation (12) or (12.1), the number of traffic blocks 208 (FIG. 2C) to be allocated to each $MS_i$.

It should be noted that it is preferable that resource allocation operations 300 be performed during the time span of a single pool of resources 200 (FIG. 2C) so that resources for the subsequent pool of resources may be allocated. However, in one alternative of the present invention it may be desirable in some circumstances for resource allocation operations 300 to be performed over a series of pool of resources 200 (FIG. 2C). In a further alternative, operations may be performed once (in a single pool of resources or over a series of pool of resources) for a series of subsequent pool of resources. That is, the allocations made in resource allocation operations 300 may be applied to series of pool of resources.

As will be appreciated by those of ordinary skill in the art, it may be desirable to implement the present invention completely in software using the existing hardware facilities of a BS 104. In such circumstances, BS I/F 404 and MS I/F 406 may be embodied as software modules or subroutines that operate using the existing BS 104 hardware. Similarly, CPU 402 and memory 408 would, in such circumstances, be the existing hardware facilities of the BS 104.

While one (or more) embodiment(s) of this invention has been illustrated in the accompanying drawings and described above, it will be evident to those skilled in the art that changes and modifications may be made therein without departing from the invention. All such modifications or variations are believed to be within the scope of the invention as defined by the claims appended hereto.

What is claimed is:

1. A method of allocating data resources for a plurality of channels, each of said plurality of channels enabling communication between a basestation (BS) and a mobilestation (MS), the method comprising:
   determining a maximum data throughput, absent any errors, of a basestation for the aggregation of the plurality of channels supported by the basestation based on:
      the number of the plurality of channels supported by the basestation;
      a bit rate associated with each of the plurality of channels; and
      a quantity of data resources to be allocated by the basestation;
   optimizing an objective function, the objective function equal to the maximum data throughput diminished by a factor corresponding to the quality of at least some of the plurality of channels, the optimizing subject to:
      all of the data resources being allocated; and
      each of the plurality of channels being allocated at least a portion of the resources; and
   allocating the data resources based on the optimizing.

2. The method of claim 1 wherein the data resources are timeslots.

3. The method of claim 1 wherein the objective function is equal to the maximum data throughput less a factor corresponding to the quality of each of the plurality of channels.

4. The method of claim 1 wherein the number of the plurality of channels between the BS and the MS is one of the number of uplink (UL) temporary block flows (TBFs) and downlink (DL) TBFs, and wherein the data resources allocated are the data resources for the corresponding one of the UL TBFs and the DL TBFs.

5. The method of claim 2 wherein the data resources allocated are the traffic resource blocks available in a pool of resources.

6. The method of claim 3 wherein the quality of each of the plurality of channels is the bit error rate.

7. The method of claim 2 wherein the objective function is $$T \times NBA \times \left[ \sum_{i=1}^{NMS} rb_i \times W_i \times (1 - BER_i) \right]$$

where T is the duration of single traffic block, NBA is the quantity of resources to be allocated, $rb_i$ is the data transfer rate, $W_i$ is the proportion of traffic blocks to be allocated to a MS, $BER_i$ is the bit error rate associated with one of the plurality of channels and NMS is the number of mobilestations in communication with the BS.

8. The method of claim 5 wherein the objective function is further constrained by a quality of service (QoS) required by each MS in communication the BS.

9. The method of claim 8 wherein the QoS constraint on the objective function is, for each MS in communication with the BS, defined by a range between a minimum portion of the resources to be allocated and a maximum portion of the resources to be allocated, and wherein for each of the plurality of channels the resources allocated falls between the minimum and maximum.

10. A resource allocator in a basestation (BS), the BS forming part of a wireless network, the resource allocator operable to:
   obtain a number of mobilestations (MS) requiring resources, a quantity of resources available for allocation and a data transfer rate of a channel between each MS and the BS;
   obtain a quality metric for each of at least some of the channels between the BS and at least some of the mobilestations;
   allocate resources available for allocation at the BS based on an optimization of an objective function, the objective function comprising a total data transmission quantity reduced by a quantity corresponding to the quality metric weighted by a proportion of the total data transmission quantity allocated to each MS, the total data transmission quantity calculated based on the rate of data transfer between each MS and the BS, the optimization subject to the constraints that each MS be allocated at least a portion of the resources available for allocation and all the resources available be allocated.

11. The resource allocator of claim 10 wherein the resources are timeslots.

12. The resource allocator of claim 11 wherein the wireless network comprises a TDMA wireless network.

13. The resource allocator of claim 10 wherein the resource allocator is formed by software loaded into a computing device forming part of the basestation.

14. A method of optimizing allocation of resources for uplink channels between a plurality of mobilestations (MS) and a basestation (BS), each uplink channel corresponding to a channel between one of the plurality of mobilestations and the BS, the method comprising:
   determining a quality measurement for a portion of the uplink channels;
   determining an approximate total data throughput able to be transmitted between the plurality of MS and the BS based on a data transfer rate for each channel, the number of the plurality of mobilestations and the quality measurement for a portion of the channels;
   optimizing an allocation of the wireless resources based on the approximate total data throughput and the constraints that all resources be allocated and that each of the plurality of MS be allocated a portion of the wireless resources available.

15. The method of claim 14 wherein the quality measurement is determined for each of the channels.

16. The method of claim 14 wherein the approximate total data throughput is a sum of the data throughput for each of the channels, wherein, for each of the channels, the data throughput, prior to being summed, is multiplied by a factor that corresponds to the quality measurement for the channel and the factor is less than or equal to one and greater than or equal to zero.

17. The method of claim 14 wherein the approximate total data throughput is a sum of the data throughput for each of the channels, wherein, for each of the channels, the data throughput, prior to being summed, is reduced by a factor that corresponds to the quality measurement for the channel.

18. The method of claim 17 wherein, for each of the channels, the data throughput, prior to being summed, is reduced by the bit error rate.

19. A method of allocating timeslots within a current group of timeslots to a plurality of communications channels transported within sequential groups, each of said groups comprising a fixed number of timeslots, said method comprising:
   allocating a percentage of said fixed number of timeslots to each of said plurality of channels so as to maximize an estimated total number of bits received without error by a recipient within said current group by estimating a number of bits in error for each of said channels for said current group based on a measured number of bits in error for each of said channels in at least one previous group.

20. A basestation operable to allocate timeslots in accordance with the method of claim 19.

21. In a communications system in which a plurality of communications channels are transported in sequential pool of resources having a fixed number of timeslots, a method of allocating timeslots within a current pool of resources to said plurality of communications channels, said method comprising:

allocating a percentage of said fixed number of timeslots to each of said plurality of channels so as to improve an estimated overall data throughput of the current pool of resources by:

calculating the actual data throughput of a pool of resources of a previous pool of resources;

defining an allocation function to be optimized, the allocation function being a function of the quality and data rate of each channel and the percentage such that high quality and high data rate communications channels are allocated a larger percentage of said fixed number of timeslots than communications channels of low quality and low data rates; and wherein each of said plurality communications channels is allocated at least some percentage of said fixed number of timeslots.

* * * * *